Nov. 28, 1961 S. I. SLATER 3,011,008
WALL PLATE FOR SWITCHES, RECEPTACLES AND THE LIKE
Filed March 10, 1960
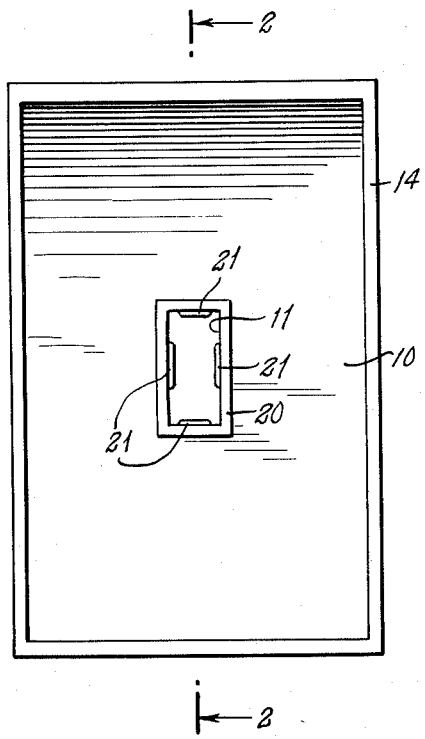
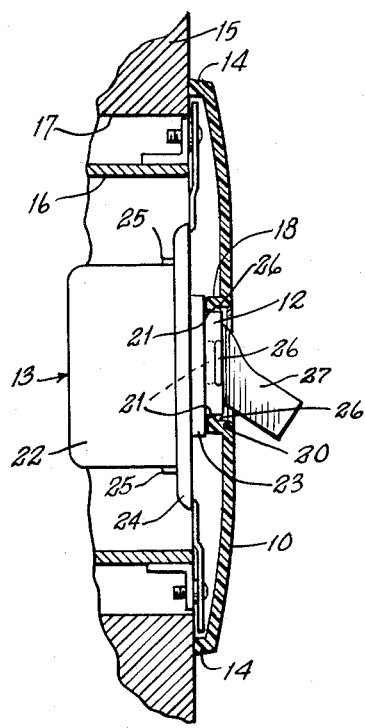
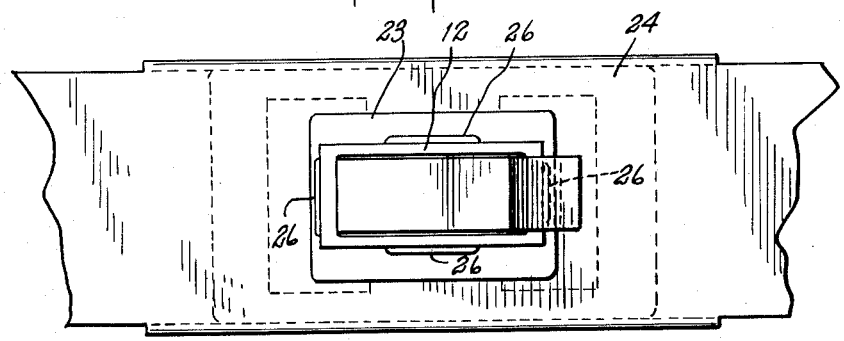
INVENTOR.
SAUL I. SLATER
BY Darby + Darby
ATTORNEYS

United States Patent Office 3,011,008
Patented Nov. 28, 1961

3,011,008
WALL PLATE FOR SWITCHES, RECEPTACLES AND THE LIKE
Saul I. Slater, Glen Cove, N.Y., assignor to Slater Electric Inc., Glen Cove, N.Y., a corporation of New York
Filed Mar. 10, 1960, Ser. No. 14,048
4 Claims. (Cl. 174—66)

The present invention relates to wall plates for use with outlet boxes having electrical wiring devices such as switches, receptacles, etc. mounted therein.

At the present time it is customary to mount wiring devices such as mentioned above in outlet boxes by affixing mounting straps forming part of the wiring device to ears of the outlet box and to then cover the working parts of the wiring device and the entire exposed open front area of the outlet box with a wall plate. This wall plate is generally, if not invariably, held in position by screws which pass through the wall plate and are threaded into apertures in the mounting strap. This mode of mounting wall plates on electric wiring devices has numerous disadvantages; the screws are small and easily lost, the screws normally lie in bevelled apertures and tend to collect dust and dirt and to become unsightly, and furthermore the screws, if not carefully inserted, damage the threads of the device supporting strap and render it necessary to replace the entire wiring device.

The present invention provides a wall plate which eliminates completely the use of screws and, moreover, requires no openings in the wall plate which, as stated above, collect dust and dirt and become unsightly. On the contrary, with the present wall plate and its method of mounting, the plate is entirely smooth, the only opening provided therein being that for the switch handle, receptacle body or the like.

Additionally, the wall plate of the present invention is so constructed that no tools are necessary to mount it in position on the wiring device while at the same time it is firmly fixed to that device when in use, but may be as readily removed as it was installed.

It is an object of the invention to provide a wall plate for electrical wiring devices so constructed that the plate is held on the wiring device and covers the outlet box frontal area solely by frictional engagement of portions of the plate and the wiring device.

It is another object of the invention to provide a wall plate such as mentioned above which is readily mounted on the wiring device without tools and which may also be readily removed while at the same time being firmly held in position and not dislodged by vibration and other incidents of like character.

Other objects and features of the invention will be apparent when the following description is considered in connection with the annexed drawings, in which, FIGURE 1 is a front elevational view of a plate in accordance with my invention;

FIGURE 2 is a vertical cross-sectional view showing the forward portion of an outlet box with a wiring device (here shown as a switch) mounted therein and with a wall plate in accordance with my invention, fixed to the wiring device and covering the frontal area of the outlet box and the opening in the wall which accommodates that box; and FIGURE 3 is a top plan view of a wiring device (here shown as a switch) adapted to cooperate with the wall plate of the instant invention.

Referring now to the drawings and particularly to FIGURES 1 and 2, there is shown at 10 a wall plate which is of the usual rectangular shape and which is provided with a central opening 11 likewise rectangular in shape adapted to receive the neck portion 12 of a cover for switch such as that shown at 13, FIGURE 2.

The wall plate 10 is, in accordance with the present invention, preferably formed of a plastic material having a limited flexibility such, for example, as acrylic or styrene plastic, although it may be made of any other suitable material as for example metal. As is customary, the plate 10 has edge portions 14 which seat against the wall 15 thus entirely covering the outlet box 16 as well as the opening 17 in the wall 15.

The opening 11 has inturned flanges 18, the edges of the opening 11 being slightly bevelled as indicated at 20 to enhance the appearance of the plate. Centrally of each one of the flanges 18 a projection 21 is formed, these four projections extending toward the center of opening 11 (see FIG. 1).

As shown in FIGURES 2 and 3, the switch 13 comprises a housing 22 within which the operating elements of the switch are positioned. A cover 23 having the neck portion 12 extending outwardly therefrom is held to the housing 22 by means of the central portion of mounting strap 24 which portion has bent over ears 25 which engage projections (not shown) on the forward edges of housing 22.

In accordance with my invention the switch neck 12 has projections 26 formed thereon adjacent the outer edge, these projections corresponding to the projections 21 of the flanges 18.

As will be seen by reference to FIGURE 2, the distance between the inner edge of a particular projection 26 and the cover 23 is substantially equal to the thickness of the corresponding projection 21. Since the flanges 18 of wall plate 11 and neck 12 of cover 23 are slightly flexible material, it is only necessary, in order to mount the plate, that the plate be positioned with the opening 11 in alignment with the neck portion 12 (the handle 27 of the switch of course extending through the opening 11), and then pressed gently toward the wall until the projections 21 snap into position behind projections 26. The plate will then be firmly held in place with the edge portions 14 engaging the wall 15 and will remain in position until removed. Such removal may be readily effected by grasping the flat wall engaging sides 14 and pulling the plate away from the wall causing the projections 21 to "snap" over the projections 26.

If desirable, the plastic utilized may be clear and transparent, thus permitting the insertion of wall paper matching that of the room in which the plate is used or painting the interior surface of the plate to match the wall paint or otherwise adding a decorative motif of any desired type by inserting material behind the wall plate. Of course, if this is not desirable, the plate may be of an opaque plastic material in any desired color.

Although the foregoing description has been confined to the construction of a wall plate for use with an electrical switch, it will be obvious that the same general arrangement may be utilized in connection with other electrical wiring devices such as pilot lamps, plug receptacles, etc. In each instance the plate will be provided with apertures matching portions of electrical wiring devices which extend therethrough and both the wiring device and the plate will be provided with respective projections which will engage when the plate is properly positioned on the wiring device.

While I have described a preferred embodiment of the invention, it will be understood that I wish to be limited not by the foregoing description, but solely by the claims granted to me.

What is claimed is:

1. Means for covering the wall opening for an outlet box and an electrical wiring device mounted therein, the wiring device having at least one forwardly extending portion, said means comprising a plate larger than the wall opening, at least one aperture in said plate accommodating the forwardly extending portion of the device, a peripheral flange about said opening and projections on said flange extending toward the center of said aperture, said projections engaging said forwardly extending portion and forming the sole means for holding the plate in position on the device and covering the wall opening.

2. In an electrical wiring device and plate for covering the wall opening for an outlet box in which the wiring device is mounted, in combination, a wiring device having a housing, a mounting strap fixed to said housing and adapted to fix said wiring device to the outlet box with the mounting strap substantially in the plane of the wall and a portion of the housing extending forwardly of the plane of the wall; projections on the periphery of said forwardly extending housing portion, said projections extending substantially parallel to the wall and being spaced therefrom, a wall plate having at least one aperture therein mating with said forwardly extending housing portion, a rearwardly extending peripheral flange on said plate about said aperture and projections on said flange, said projections extending substantially parallel to the wall, said projections lying immediately adjacent the plane of the wall whereby the plate is retained on the wiring device by engagement of said projections with the mating projections of said wiring device housing portion.

3. In an electrical wiring device and plate for covering the wall opening for an outlet box in which the wiring device is mounted, in combination, a wiring device having a housing, a mounted strap fixed to said housing and adapted to fix said wiring device to the outlet box with the mounting strap substantially in the plane of the wall and a portion of the housing extending forwardly of the plane of the wall; projections on the outer periphery of said forwardly extending housing portion, said projections extending substantially parallel to the wall and being spaced therefrom, a wall plate having a least one aperture therein mating with said forwardly extending housing portion, a rearwardly extending peripheral flange on said plate about said aperture and projections on said flange, said projections extending toward the center of said aperture and substantially parallel to the wall, said projections lying immediately adjacent the plane of the wall and between said housing portion projections and the body of said housing whereby the plate is retained on the wiring device by engagement of said projections with the mating projections of said wiring device housing portion.

4. An electrical switch and plate therefor, said plate covering the wall opening for an outlet box in which the switch is mounted, in combination, a switch having a housing, a mounting strap fixed to said housing and adapted to fix said switch to the outlet box with the mounting strap substantially in the plane of the wall, a cover for said switch housing, said cover having a portion extending forwardly and terminating forwardly of the plane of the wall, said neck portion being hollow, the switch operator extending therethrough, projections on the outer periphery of said neck portion of said cover, said projections extending outwardly substantially parallel to the wall and spaced from the plane of the wall, a wall plate having an aperture therein mating with said forwardly extending neck portion, said wall plate having a rearwardly extending peripheral flange on said plate to space said plate so that the face thereof lies substantially in the plane of the forward termination of said neck, projections on said flange, said projections extending toward the center of said aperture and lying substantially parallel to the wall, said projections lying immediately adjacent the plane of the wall and between said neck projections and the body of said housing whereby the wall plate is retained on the switch solely by engagement of said plate flange projections with the mating neck projections.

References Cited in the file of this patent
UNITED STATES PATENTS

| 1,517,684 | Recker | Dec. 2, 1924 |
| 1,705,014 | Hubbell | Mar. 12, 1929 |
| 2,212,145 | Benander | Aug. 20, 1940 |